United States Patent Office 3,384,609
Patented May 21, 1968

3,384,609
PLASTICISED SULPHUR
Jean Baptiste Signouret, Billiere, Bernard Audouze, Orthez, and Jean Barge, Pau, France., assignors to Societe Nationale des Petroles d'Aquitaine, Paris, France
No Drawing. Filed July 14, 1965, Ser. No. 472,033
Claims priority, application France, July 23, 1964, 982,775
11 Claims. (Cl. 260—37)

ABSTRACT OF THE DISCLOSURE

A novel plastic material is formed by the homogeneous union of elementary sulphur with a resinous condensation product formed by the simultaneous action of a haloepoxy-alkane and hydrogen sulphide upon an aqueous solution of a polysulphide of an alkali or alkaline earth metal. The products of the process of the present invention may be produced with varying degrees of flexibility or hardness, may contain fillers such as glass fibers, glass balls or other mineral material, and are useful for forming resistant coatings and markings on concrete, asphalt or similar, surfaces.

---

The invention relates to a new material having plastic properties, containing elementary sulphur and an organic thio compound. It also covers a process for the preparation of this material.

Various compositions based on sulphur and resins are known and certain applications exist therefore, but there is still always the problem concerning obtaining a material which is sufficiently resistant to friction and to chemical and atmospheric agents, which is not softened too much under the effect of moderate heating, but which moreover does not become cold-short and brittle with ageing.

The present invention contributes to the solution of this problem. It is possible therewith, by an adequate proportioning of sulphur and an organic adjuvant, to obtain at will a material of greater or lesser flexibility or hardness, which is capable of forming excellent resistant coatings, particularly for concrete, brickwork, asphalted surfaces or other similar materials, particularly for directional lines on roads.

The new plastic material according to the invention is formed by the homogeneous union of elementary sulphur with a resinous condensation product, formed by the simultaneous action of a haloepoxyalkane and hydrogen sulphide on an aqueous solution of a polysulphide of alkali or alkaline earth metal, this condensation product being soluble in molten sulphur.

The said resinous condensation product, which acts as a true plasticiser of sulphur, can be used in any proportions; depending on the use envisaged, it may in particular be added to the sulphur in very variable proportions, for example, from 1% to 99% by weight of this product. Generally speaking, the most useful materials according to the invention contain 2 to 80 parts by weight of this condensation product to 98 to 20 parts by weight of sulphur, and usually 10 to 50 parts to 90 to 50 parts of sulphur.

The preparation of the new material is carried out by homogeneous mixing of the condensation product with molten sulphur at temperatures between 120° and 250° C. and preferably between 140 and 160° C. Temperatures in the region of 150° C. are to be particularly recommended.

Different condensation products of chloroepoxyalkanes, particularly of epichlorhydrin, with sulphides or polysulphides of alkali or alkaline earth metals are well known; the description thereof is for example to be found in French Patents, No. 677,431 of June 26, 1929, and No. 966,389 of May 12, 1948. However, these known products are generally insoluble in molten sulphur, while the present invention covers the materials obtained from condensation products which are soluble in this metalloid.

Soluble ocndensation products can be prepared under special conditions, namely, by simultaneous reaction of $H_2S$ and a haloepoxy alkane on an aqueous solution of an alkali or alkaline earth polysulphide, the quantity of $H_2S$ being at least 1 mol per mol of polysulphide. This reaction can be carried out between ambient temperature and 100° C., with a proportion of haloepoxyalkane of about 1.5 to 2.5 mols per mol of the polysulphide being used.

In the preparation of condensation products which are soluble in molten sulphur, the aqueous solution of alkali or alkaline earth polysulphide is preferably formed of 1 to 7 mols of polysulphide per litre of water, and best of all 3 to 4 mols. Excellent results are obtained when the polysulphide contains 1.5 to 3 atoms of sulphur per equivalent of metal to which it is bonded.

Depending on the conditions under which the condensation product has been prepared, the material which results from the dissolving of this product in the molten sulphur may be in the form of a thermoplastic homogeneous composition which liquefies in the region of 150° C.

Thermoplastic compositions are obtained when the condensation product of the haloepoxyalkane with the polysulphide and $H_2S$ has been prepared at temperatures from 50° to 100° C., and preferably betwen 60° and 90° C., the proportion of haloepoxyalkane being 1.5 to 2 mols per mol of polysulphide, and preferably as close as possible to 2 mols, without exceeding this value. Under these conditions, the condensation products are completely dissolved in the molten sulphur, particularly at about 150° C., and the forming solution remains stable, that is to say, does not undergo any setting, hardening or precipitation after several hours at this temperature, for example 6 to 10 hours, even without stirring.

Particularly useful thermoplastic compositions are prepared form condensation products of which the molecular weights vary between 600 and 3,000 and preferably between 650 and 2,500, the products being fusible below or at 100° C.

For the preparation of condensation products which are soluble in sulphur, the best proportions of the reagents are:

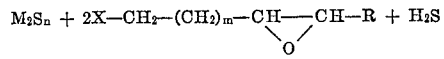

$M_2$ representing two monovalent cations can obviously be replaced by a single divalent cation as for example Ca or Ba. The average number $n$ should be greater than 1 and may assume various values, for example up to 8, but it is preferably between 1 and 3 and best of all close to 2. The halogen X may be any one of the four halogens I, Br, Cl, F, but for economic reasons, chlorine will be particularly referred to in the present description. The number $m$ which characterises the length of the hydrocarbon chain adjoining the epoxy group on the halogen side, is capable of wide variation, depending on the the nature of the hydrocarbon from which the epoxy is derived; however, this number is generally 0 to 17 and usually 0 to 3, these being values corresponding to the oxides of propene, butenes, pentenes and hexenes when R represents a hydrogen atom. As regards this radical R, it may be formed by H or by any aliphatic group, but generally the number of carbon atoms thereof does not exceed 16; this number is usually 1 to 3.

Although the process is applicable to oxides of olefines in which the bonds with the oxygen are in positions other than the alpha-beta position, it is this last epoxide position which is most usual in the industrial products. However, the epoxy group is not necessarily at the end of a chain;

as indicated above, R can represent for example an alkyl group; nevertheless, in the most frequent industrial cases, R is a hydrogen and the epoxy group has a terminal position in the molecule.

Furthermore, as regards the position of the halogen or halogens in the aliphatic chain of the epoxide, it is not limited to the alpha position with respect to the carbon atom carrying the oxygen, although this is the most usual position.

Finally, the following are included among the haloepoxyalkanes, which in practice are the most easily available for the preparation of the condensation products: 1-chloro (or even 2,3 and/or 4-chloro)-5,6-epoxyhexane; 1-chloro (or even 2 and/or 3-chloro)-4,5-epoxypentane; 1-chloro-3,4-epoxybutane; 2-bromo-3,4-epoxybutane; 1-chloro-2,4-epoxybutane; 1-chloro-2,3-epoxypropane; this latter, known under the name of epichlorhydrin, is a very familiar chemical product which is readily obtainable economically in large quantities, and it is for this reason that this has been used for the preparation of most of the condensation products during the carrying out of the present invention.

In conformity with the known general laws, the condensation reaction carried out under the conditions according to the invention proceeds faster as the temperature is higher. If the operation takes place between 50° and 100° C., the reaction becomes almost complete after respectively about 4 hours to ½ hour. By way of non-limiting indication, it can be said that, at 60° C., it is desirable to allow the condensation to proceed for 3 hours, while generally 1 hour is sufficient at 85° C.

One preferred and particularly advantageous form of the invention consists in first of all preparing a fairly concentrated solution of polysulphide by dissolving sulphur and simultaneous absorption of hydrogen sulphide in an aqueous solution of a base, for example, NaOH or KOH; the proportions of the reactants are calculated so as to lead to a polysulphide of the composition $M_2S_n$, where $n$ equals 1.5 to 3; the solution of the latter is then heated to a temperature of 60° to 90° C., and 2 mols of epichlorhydrin per mol of $M_2S_n$ are injected thereinto. The reaction mixture is then kept hot for 3 to 1 hours, depending on the temperature, while continuing to inject hydrogen sulphide thereinto in a proportion such that the total composition becomes as close as possible to:

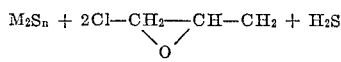

The condensation product which forms and which is separated from the aqueous phase is then washed with water.

It is probable that the constitution of these products can be represented by the summary formula:

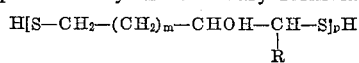

in which $m$ and R have the meanings indicated above, while $p$ has a mean value of 4 to 24. The invention is not in any way limited by this hypothetical formula.

The condensation products, when they have been prepared from 1-chloro-2,3-epoxypropane and an alkali polysulphide $M_2S_n$, in which $n$ is 1.5 to 3, have a sulphur content of 40% to 55% by weight and usually 43% to 53% by weight; their SH content is generally from 3% to 16%, depending on the molecular weight of the product. They seem to correspond to the summary formula:

$$H-(S-CH_2-CHOH-CH_2-S)_p-H$$

in which the mean value of $p$ is 4 to 24.

The following non-limiting examples illustrate the invention from the point of view of the preparation of the condensation products which are used, these being shown in Examples 1 to 10; as regards the obtaining of the actual plasticised sulphur materials, this forms the subject of Examples 11 to 21.

Solubility test

During the work as set out in the present description, the typical test conducted in the following manner was adopted as criterion of the solubility of a condensation product in sulphur.

15 g. of a product to be tested are mixed with 85 g. of sulphur in a glass vessel; the mixture is heated while stirring for one hour at 150° C.; if the product is completely soluble, without residue and without causing precipitation in the solution, and if the casting of this solution gives a homogeneous sheet after cooling, it is considered that the product is "soluble in sulphur." In the contrary case, it is said to be insoluble.

Example 1

The preparation is carried out in a reactor provided with a stirrer device, a gas-injection tube, a thermometer, a refrigeration device (cooling bath) and also a gas outlet with condenser. 14 kg. of water and 4 kg. of sodium hydroxide are successively introduced. These are stirred to form a solution, 1.6 kg. of sulphur in powder form are added and hydrogen sulphide is injected while stirring until 1.7 kg. are absorbed. There is then obtained a solution of sodium polysulphide of the average number $n=2$.

9.25 kg. of 1-chloro-2,3-epoxypropane are then injected at 85° C. while continuing to inject hydrogen sulphide in excess; the injection is carried out while cooling and lasts about one hour. The mixture is then heated to 85° C. for one hour while stirring and with an excess of hydrogen sulphide. 1.7 kg. thereof are thus combined, that is, a total of 3.4 kg.

After decantation and removing the upper aqueous layer, washing takes place three times with cold water (20° C.) while stirring on each occasion with 10 litres of water to eliminate the sodium chloride.

The soft resin obtained which is soaked with water, is dehydrated by heating to 110° C. in a cylindrical vessel equipped with a stirrer device and a thermometer. There are obtained 9 kg. of a greenish yellow viscous liquid with the following characteristics:

| | Percent |
|---|---|
| S | 50.2 |
| SH | 12 |
| Ash | 0.2 |

Average molecular weight 660 according to SH.

This resin is soluble in dioxane, tetrahydrofuran and dimethyl formamide. By filtration of its solutions, it is possible completely to eliminate the residual sodium chloride.

Example 2

Using the working procedure of Example 1, a series of preparations were carried out at different temperatures, the resinous condensation product obtained being weighed each time. The following table summarises these tests: it indicates the temperatures, the condensation periods at each of these temperatures and the weights of resin obtained; the last column headed "Sulphur test" gives the result of the standard solubility test as previously defined.

| Temp., ° C. | Duration, hours | Resin obtained | Sulphur test |
|---|---|---|---|
| 40 | 3 | 8.4 | Precipitation of resin. |
| 50 | 3 | 8.6 | Partial precipitation of resin. |
| 60 | 1 | 8.1 | Soluble. |
| 60 | 3 | 9.0 | Do. |
| 70 | 1 | 8.4 | Do. |
| 70 | 3 | 8.7 | Do. |

It is seen that condensation products which are completely soluble in sulphur are obtained above 50° C.

Example 3

In condensation tests similar to those of Example 1, at 85° C. for 1 hour, the quantity of $H_2S$, introduced cojointly with the epichlorhydrin during the condensation, was caused to vary. The following results were found:

| Kg. H₂S | Mol. H₂S/mol. Na₂S₂ | Resin obtained | Sulphur test |
|---|---|---|---|
| 1.0 | 0.59 | 8.3 | Partly insoluble. |
| 1.7 | 1 | 9 | Soluble. |
| 2.5 | 1.47 | 9.1 | Do. |
| 3.0 | 1.77 | 9.1 | Do. |

Example 4

While operating as in Example 1, at 85° C. for 1 hour, using 1.7 kg. of H₂S introduced during the condensation, the quantities of epichlorhydrin used were varied with respect to the 9.25 kg. which corresponded theoretically to the treated sodium polysulphide. These tests lead to the following results:

| Kg. epichlor-hydrin | Mol. epichlor/mol. Na₂S₂ | Resin obtained | Sulphur test |
|---|---|---|---|
| 10.0 | 2.17 | 10 | Precipitation. |
| 9.25 | 2 | 9 | Soluble. |
| 9.0 | 1.94 | 8.8 | Do. |
| 8.0 | 1.73 | 8 | Do. |

This certainly shows that it is the stoichiometric proportion of epichlorhydrin which constitutes the maximum which can be used, when sulphur soluble resin has to be obtained, without setting.

Example 5

By modifying the conditions of Example 1, in that the reaction temperature is 95° C., the following result is obtained after one hour:

Resin _____ kg__ 8.2
S _____ Percent__ 48.2
SH _____ Percent__ 10.3

Example 6

As initial material, there is used a polysulphide in which the average number $n=1.5$ and, which has been prepared under the same conditions as in Example 1, except that 0.80 kg. of sulphur are reacted with 2.5 kg. of hydrogen sulphide. The temperature of the reaction was 85° C. One hour after the injection of epichlorhydrin, the weight of resin obtained is 8.5 kg. and the resin contains:

Percent
S _____ 46
SH _____ 16

A product soluble in sulphur is obtained, which gives a plastic film.

Example 7

Under the same conditions and with the same equipment as in Example 1, 3.2 kg. of sulphur and 1.7 kg. of hydrogen sulphide are caused to react with 4 kg. of sodium hydroxide dissolved in 14 kg. of water, and there is then obtained a sodium polysulphide solution in which $n$ is on average 3.

This solution is caused to react at 85° C. with 9.5 kg. of epichlorhydrin and an excess of hydrogen sulphide. It is left for 1 hour at 85° C., washed by mixing with cold water until the washing water is neutral. There is then obtained a quantity of resin weighing 10.5 kg. and having the characteristics:

Percent
S _____ 53
SH _____ 3

Mean molecular weight 2,500 (according to the SH%) and the resin is soluble in sulphur.

Example 8

In a procedure similar to that of Example 1, the 9.25 kg. of 1-chloro-2,3-epoxy-propane are replaced by 10.65 kg. (10 moles) of 1-chloro-3,4-epoxy-butane. There are obtained 9.9 kg. of a resin similar to that of Example 1, the sulphur content therein being 47.1% by weight.

Example 9

In 1.5 liters of an aqueous solution of 3.7 moles per liter of potassium polysulphide the average formula of which was $K_2S_{1.88}$, hydrogen sulphide is injected at ambient temperature. When 4 moles H₂S were thus absorbed per liter of the solution, 15.1 kg. of 1-bromo-3,4-epoxy-butane (10 moles) were introduced into the solution while injecting H₂S was continued, temperature having been raised to 68° C. The reaction medium was kept at that temperature, under continuously stirring, for 2½ hours, H₂S being still passed therethrough during this time. After decantation and washing as in Example 1 a similar resin was obtained the ponderal sulphur content of which was 43%.

Example 10

In the same procedure as in Example 9, 5.55 moles of calcium polysulphide having the average formula $CaS_{2.46}$ were used instead of potassium polysulphide, and the halo-epoxy-alkane used was 2-chloro-3,4-epoxy-hexane in the amount of 12 kg. (9.95 moles). The resin obtained had 42.2% sulphur by weight.

Example 11

A mixture of 48 kg. of condensation product, obtained according to Example 1, with 52 kg. of powdered sulphur, is prepared by progressive addition of this product to the molten sulphur, kept at 149 to 151° C. After stirring for 40 minutes at this temperature, there is obtained an easily pourable homogeneous solution, which gives a pliable composition in the cold state. The solution is applied, as a coating, to concrete walls; the lining thus formed adheres satisfactorily to the concrete and is resistant to bad weather conditions and sulphurous discharges.

Example 12

90 kg. of powdered sulphur are mixed with 10 kg. of condensation product prepared according to Example 7, and the mixture is heated to the region of 145° C., while stirring well; after 70 minutes, a perfectly homogeneous solution is obtained, which is used for providing the road warning strips directly on the bitumen surface of the road. The lines adhere satisfactorily to the bitumen; during continuous observation, no alteration of the strips was found after 13 months.

Example 13

2 kg. of sulphur are added to 8 kg. of a molten condensation product obtained according to Example 6, and the mixture is heated to between 125° and 135° C. while stirring, until complete homogenisation is obtained. The liquid thus formed is employed for impregnating the surface of a wall made of porous bricks; the wall protected by this impregnation satisfactorily resists bad weather influences, an atmosphere polluted with SO₂ and humidity. The resistance of the lining to shocks is considerably improved when fibres and particularly glass fibres are incorporated therein.

Example 14

0.5 kg. of a condensation product prepared according to Example 5 is added in portions and while stirring to 9.5 kg. of molten sulphur, kept at 156° C. The homogeneous solution which is obtained has added thereto 2 kg. of dry bentonite as a fine powder, and it is poured into the cracks in a cracked bitumen surface in order to repair and level this surface. After 3 months of cold weather, no fresh cracking has appeared in this surface. The same result is obtained with a similar product prepared with the resin obtained according to Example 8.

Example 15

90 kg. of liquid sulphur at 140° C. are mixed with 10 kg. of product prepared according to Example 1. After 70 minutes, 1.75 kg. of mineral colouring substance based on cadmium sulphide and 0.050 kg. of "jaune orazol"

organic colouring agent are added. The mixture is left for one hour at 145° C., while stirring. It is poured and cooled. The thermoplastic composition which is obtained, remelted and poured by a special machine, can be employed for supplying the road warning lines directly to a bituminous surface. No change in the lines was found after three months.

Example 16

A thermoplastic composition identical to that of Example 9 is prepared. When it is used as warning lines on roads, blue-tinted glass balls, especially for road surfaces, are incorporated in the liquid composition, thus 5 kg. of balls are added to 100 kg. of product. There are also added 2 kg. of glass balls to the surface per 100 kg. of product. A line or strip is obtained with a reflecting power which is distinctly improved, as is also the coefficient of friction.

Example 17

A thermoplastic composition, identical with that of Example 9, is remelted with subsequent addition, at the instant of spreading, of 10 kg. of fine sand to 100 kg. of plasticised sulphur. A line or strip is obtained which has a high coefficient of friction.

Example 18

A thermoplastic composition identical with the composition prepared according to Example 9 is mixed with 10 kg. of powdered pumice stone per 100 kg. of material. A plastic composition is obtained which, when suitably poured, gives a film which has a high coefficient of friction.

Example 19

A mixture of 2 kg. of the condensation product obtained according to Example 1, with 98 kg. of liquid sulphur at 145° C. is prepared by stirring the material during 1 hour. A homogeneous solution is thus formed and it is used directly for tight sealing porous bricks. The bricks are also coated with the solution; the sealing and the coating adhere very firmly to the bricks.

Example 20

A sulphur concrete is prepared by mixing 2 kg. of the resin prepared according to Example 5 with 98 kg. of molten sulphur at 145° C., and then adding the mixture with 100 kg. of sieved sand 60% of which pass through a screen having 0.074 mm. openings. The concrete is used as a ground coating which well withstands temperature changes and the action of atmospheric and chemical agents.

Example 21

To 25 kg. of molten sulphur kept at 140° C.–150° C. there are added, under stirring, 75 kg. of the resin prepared according to Example 7, the addition being controlled so as to never have an excess of not yet dissolved resin in the mixture. The operation lasts 4 hours. The thick homogeneous solution thus obtained is mixed with 100 kg. of dry sand at 140° C. for 2 hours; 50 kg. of gravel are then added under mixing. The material obtained is spread on the ground to make a road; it withstands usual chemical and atmospheric agents, it is non-skid and has a satisfactory pliability.

What is claimed is:

1. Process for the preparation of a plastic composition comprising sulphur and a resin, characterised in that there is dissolved in molten sulphur at a temperature of between 120° and 250° C., a resin obtained by the simultaneous condensation of 1.5 to 2.5 mols. of a haloepoxy alkane, and at least 1 mol. of hydrogen sulphide, with 1 mol. of an alkali or alkaline earth metal polysulphide in an aqueous solution containing from 1 to 7 mols. of polysulphide per liter of water, said condensation being effected at temperatures between 50° and 100° C.

2. Process according to claim 1, characterised in that the said resin is obtained in aqueous medium, the proportion of hydrogen sulphide being from 1 to 2 mols. and that of haloepoxy alkane from 1.5 to 2 mols. per mol. of polysulphide.

3. Process according to claim 1, characterised in that the haloepoxy alkane contains 3 to 6 carbon atoms.

4. Process according to claim 1, characterised in that the halogen is chlorine.

5. Process according to claim 2, characterised in that the haloepoxy alkane is 1-chloro-2,3-epoxypropane, the polysulphide is that of an alkali metal containing 1.5 to 3 sulphur atoms to 2 atoms of alkali metal, the resin being obtained at a temperature from 60° to 90° C.

6. Process according to claim 5, characterised in that the said resin melts at a temperature not exceeding 100° C.

7. Process according to claim 2, characterised in that the said resin has an average molecular weight from 600 to 3,000.

8. Process according to claim 2, characterised in that the said resin contains 40% to 55% by weight of sulphur and has an average molecular weight from 650 to 2,500.

9. Process according to claim 2, characterised in that the quantity of dissolved resin is from 2 to 80 parts by weight for respectively 98 to 20 parts of molten sulphur, and that the dissolving has taken place between 120 and 250° C., preferably at about 150° C.

10. Plastic composition, characterised in that it is prepared by the process according to claim 9.

11. Composition according to claim 10, characterised in that it contains, in the dispersed state, inorganic solid particles, selected from the group consisting of glass balls, glass fibers, asbestos fibers, pumice powder, other mineral material, and sand.

References Cited

UNITED STATES PATENTS 3,290,266  12/1966  Barnes et al. _____ 260—30.8
3,316,115  4/1967  Barnes et al. _____ 106—287

FOREIGN PATENTS 966,389  3/1950  France.

ALLAN LIEBERMAN, Primary Examiner.

MORRIS LIEBMAN, Examiner.